Oct. 9, 1962  F. STADELMAN  3,057,497
APPARATUS AND METHOD FOR DE-PANNING BREAD LOAVES OR THE LIKE
Filed April 4, 1960  7 Sheets-Sheet 1
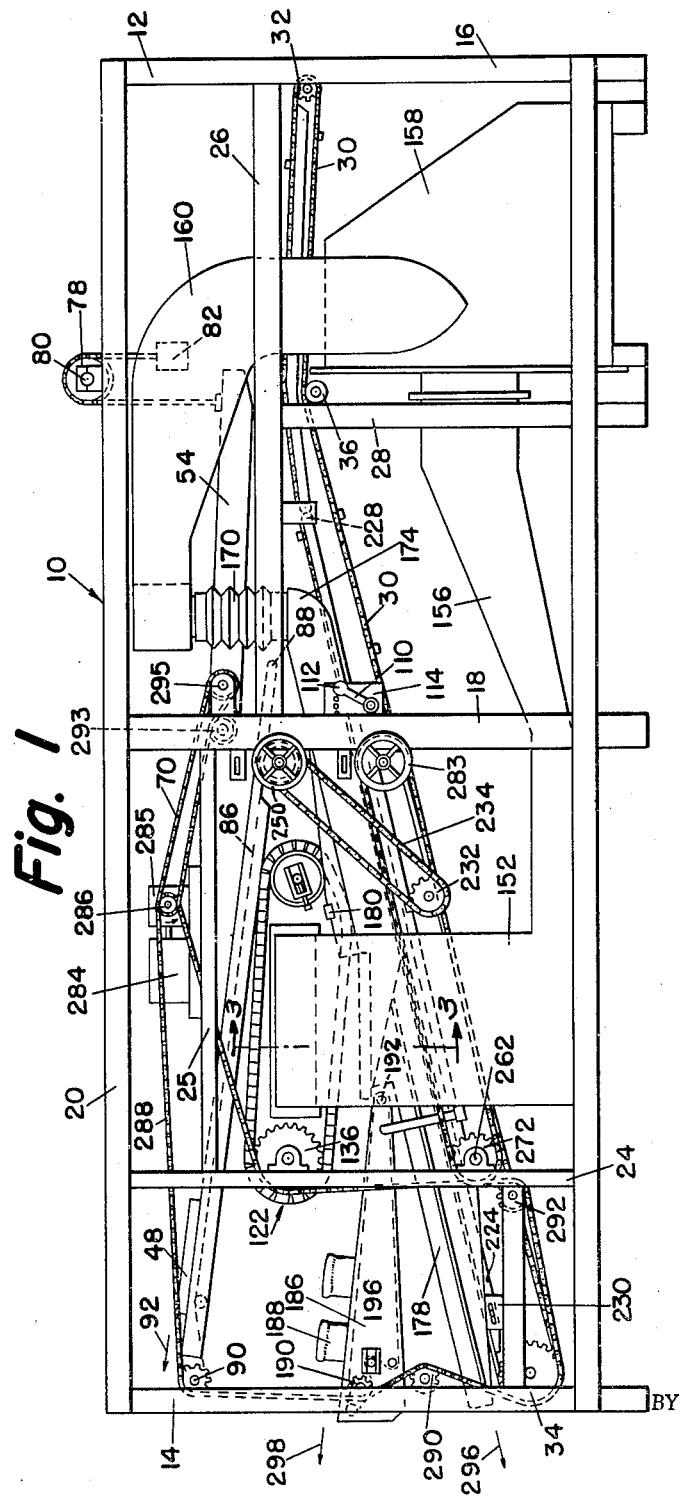
INVENTOR.
FRANK STADELMAN
BY Arthur H. Seidel
ATTORNEY INVENTOR.
FRANK STADELMAN
BY Arthur H. Seidel
ATTORNEY

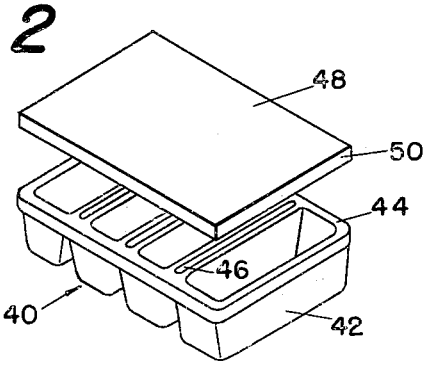
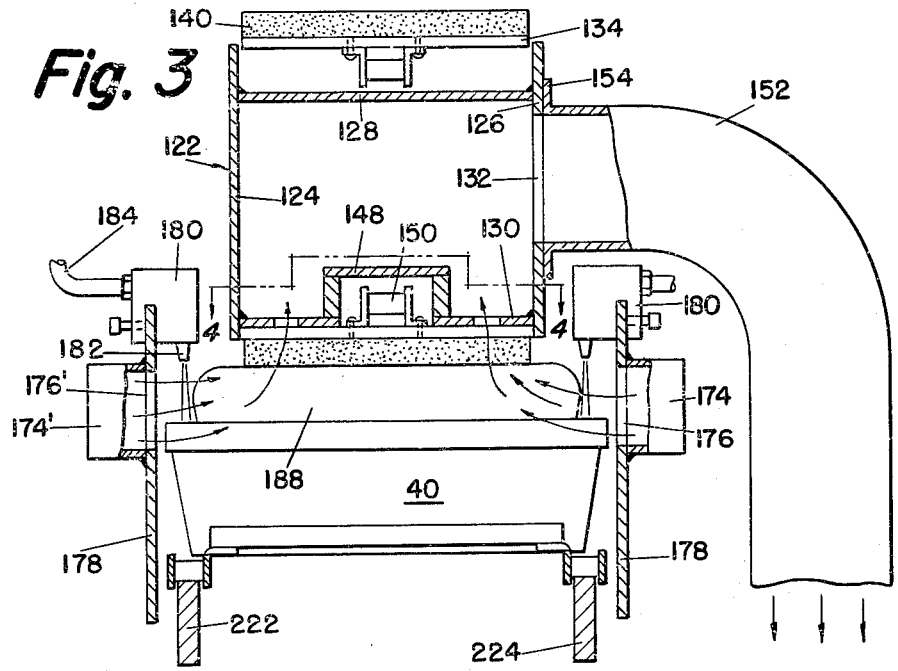
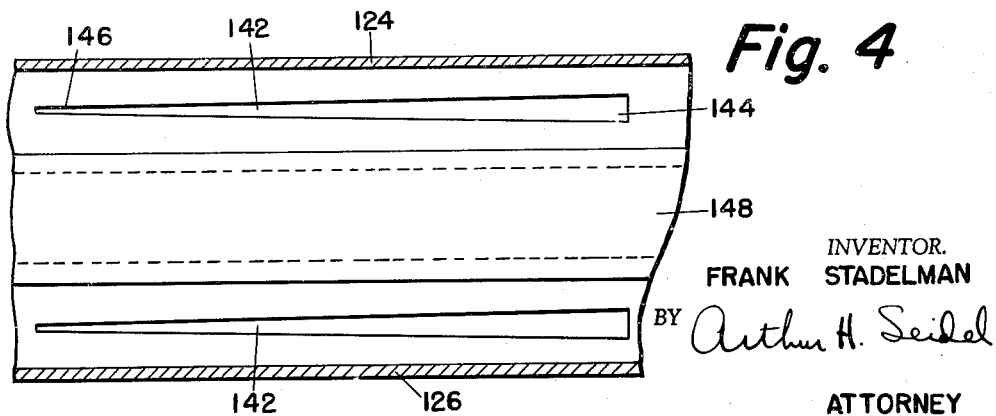

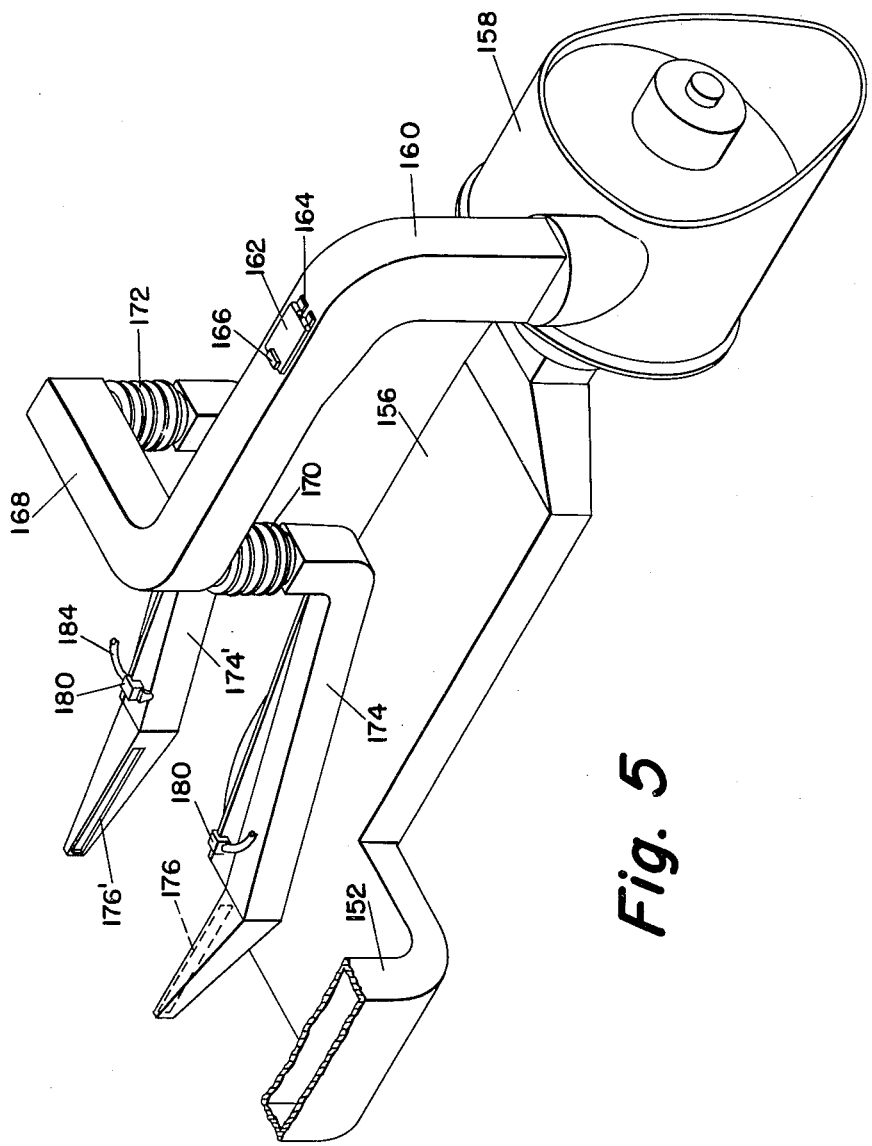

Oct. 9, 1962 F. STADELMAN 3,057,497
APPARATUS AND METHOD FOR DE-PANNING BREAD LOAVES OR THE LIKE
Filed April 4, 1960 7 Sheets-Sheet 6
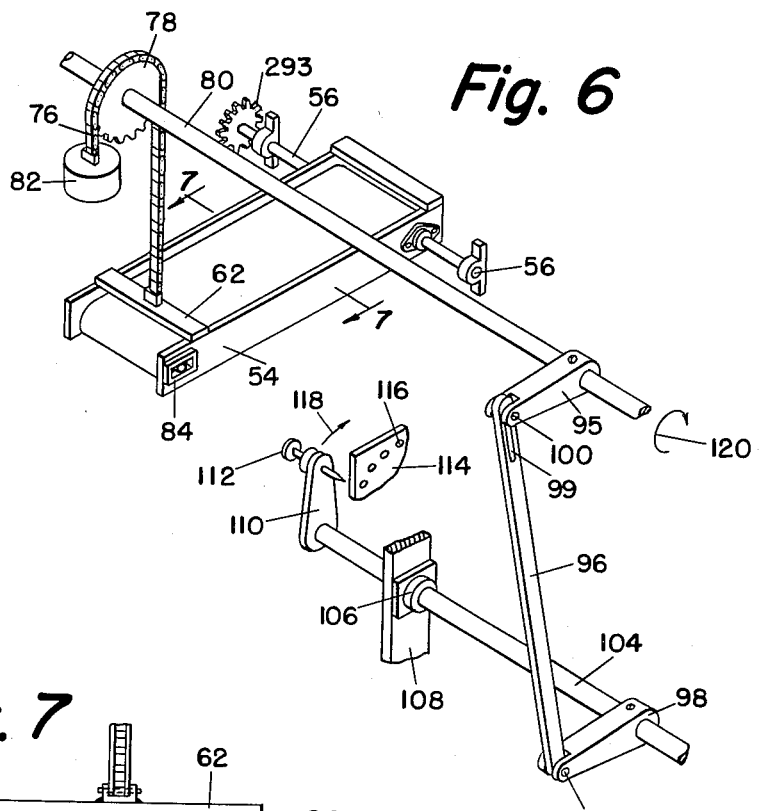
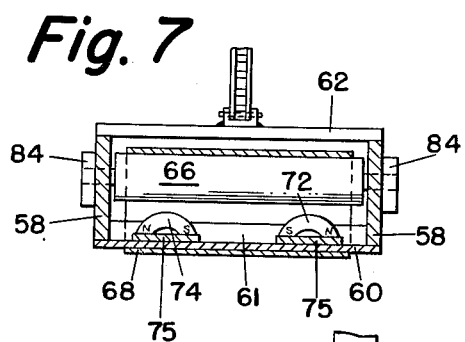
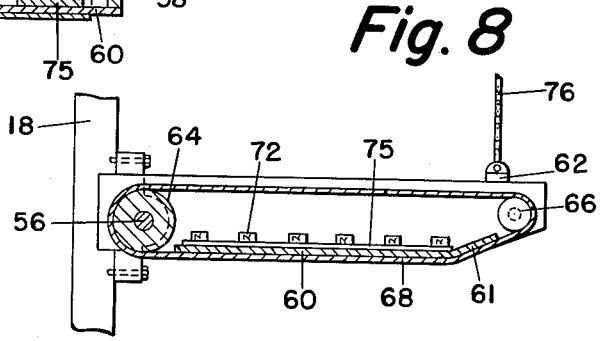
INVENTOR.
FRANK STADELMAN
BY Arthur H. Seidel
ATTORNEY Oct. 9, 1962 F. STADELMAN 3,057,497
APPARATUS AND METHOD FOR DE-PANNING BREAD LOAVES OR THE LIKE
Filed April 4, 1960 7 Sheets-Sheet 7
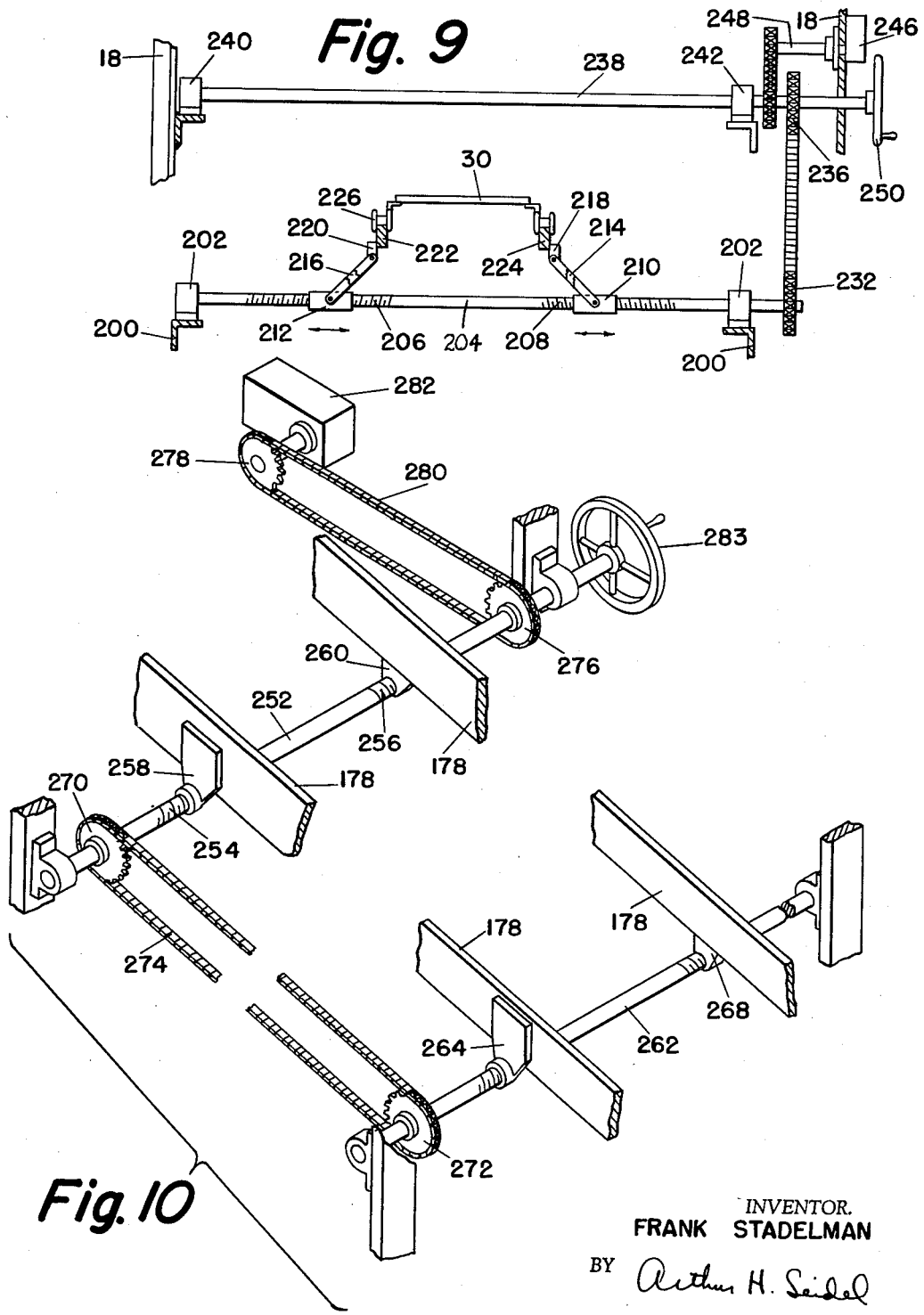
INVENTOR.
FRANK STADELMAN
BY Arthur H. Seidel
ATTORNEY

United States Patent Office 3,057,497
Patented Oct. 9, 1962

3,057,497
APPARATUS AND METHOD FOR DE-PANNING BREAD LOAVES OR THE LIKE
Frank Stadelman, Cranford, N.J., assignor to Latendorf Conveying Corporation, Bayonne, N.J., a corporation of New Jersey
Filed Apr. 4, 1960, Ser. No. 19,856
12 Claims. (Cl. 214—309)

This invention relates to apparatus and method for de-panning bread loaves or the like.

This application is a continuation in part of the apparatus and method set forth in my co-pending application Serial No. 834,726, filed August 19, 1959.

While the apparatus set forth in the above mentioned co-pending application functions satisfactorily, the applicant has found that the bread may be supported on the underside of the bread conveyor in a manner which precludes tilting of adjacent bread loaves. Also, it has been found that the lids from the pan straps may be removed in a superior manner.

It is an object of the present invention to provide a novel apparatus and method for automatically de-lidding and de-panning bread loaves.

It is another object of the present invention to provide an apparatus and method for de-lidding and de-panning bread loaves in which the loaves of bread are lifted from the pans of the pan strap and supported on a bread conveyor without tilting of adjacent loaves.

It is a further object of the present invention to provide an apparatus and method for de-lidding pan straps without injuring the lids.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevational view of the automatic de-lidding and de-panning machine of the present invention.

FIGURE 2 is a perspective view of a pan strap and its lid, the lid being shown in a removed position.

FIGURE 3 is a partial sectional view taken along the lines 3—3 in FIGURE 1, with portions not being shown for purposes of clarity.

FIGURE 4 is a plan view taken along lines 4—4 in FIGURE 3.

FIGURE 5 is a partial perspective view showing the recirculation circuit.

FIGURE 6 is a perspective view of the de-lidding conveyor and its operator.

FIGURE 7 is a partial cross-sectional view taken along the lines 7—7 of FIGURE 6.

FIGURE 8 is a longitudinal cross-sectional view of the de-lidding conveyor shown in FIGURE 6.

FIGURE 9 is a diagrammatic view, partially in section, of the height adjusting means for the pan strap conveyor of the present invention.

FIGURE 10 is a partial perspective view of the width adjusting mechanism for the guide rails of the present invention.

Referring to the drawing, where like numerals indicate like elements, there is shown in FIGURE 1 an elevational view of the machine of the present invention designated generally as 10.

Figure 1A:
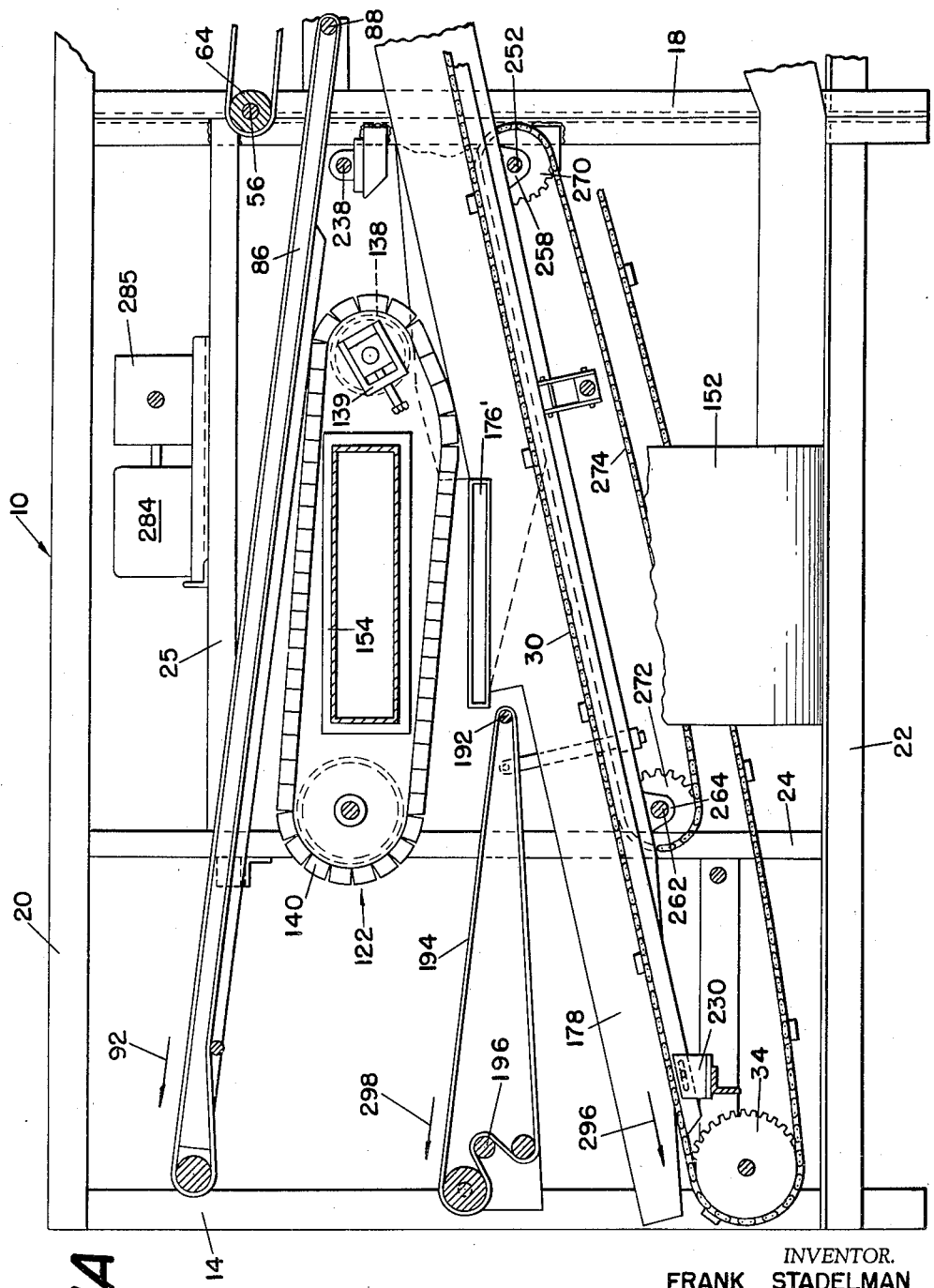
FIGURE 1A is a longitudinal sectional view of the left hand end of the machine in FIGURE 1 on an enlarged scale.

Machine 10 comprises a pair of substantially rectangular frames 12. Frames 12 comprise a plurality of end posts 14 and 15 and a center post 18. The end posts 14 and 16 and the center post 18 support upper horizontal beam 20 and lower horizontal beam 22 in spaced relation. The frames 12 are connected together by intermediate beams which support the frames 12 in spaced vertical relation. The upper and lower horizontal beams 20 and 22 are connected together by a brace 24. A horizontal brace 26 extends between end post 16 and center post 18. A vertical brace 28 extends between horizontal brace 26 and the lower horizontal beam 22.

A conveyor 30 extends from end post 16 to end post 14. As shown more clearly in FIGURE 1, the conveyor 30 has a horizontal portion extending between the end post 16 and the vertical brace 28, and an angled portion extending between the vertical brace 28 and the end post 14. The angled portion of the conveyor 30 extends downwardly and away from the horizontal portion thereof. The conveyor 30 comprises a flexible belt, a driving sprocket 34 and a driven sprocket 32. The driving sprocket 34 of the conveyor 30 is rotated in a counter-clockwise direction so that articles placed on the conveyor 30 move from end post 16 to end post 14. The horizontal portion and angled portion of the conveyor 30 is made possible by idler 36.

The entrance portion of the machine 10 is located adjacent the end post 16. Guide rails similar to the structure set forth in the above mentioned co-pending application are provided adjacent the horizontal portion of the conveyor 30 for guiding pan straps placed thereon.

As shown more clearly in FIGURE 2, each pan strap 40 includes a plurality of individual pan elements 42. Each of the pan elements 42 is intended to hold a single loaf of bread or the like. The pan elements 42 are rigidly held in spaced side-by-side relation by a rectangular frame 44 and a plurality of transversely disposed spacer elements 46 which connect the adjoining parallel edges of adjacent pan elements 42. The pan strap 40 is provided with a lid 48. Lid 48 is made from magnetic material and is provided with a depending peripheral flange 50 which fits over the frame 44.

Referring to FIGURES 1 and 6 through 8, it will be seen that a de-lidding conveyor 52 has been provided. The de-lidding conveyor 52 comprises a trough-like housing 54 pivotably secured to rod 56. Rod 56 extends across the width of the machine 10 and is supported at its extremities in bearings. As shown more clearly in FIGURE 7, the housing 54 comprises a pair of upright substantially parallel side walls 58 and a bottom wall 60. At its forward end, the bottom wall 60 is provided with an upwardly angled toe portion 61. A strut 62 extends across the top surface of the side walls 58 at the forward end of the housing 54. A driving roller 64 is connected to rod 56 for rotation therewith. The housing 54 is provided with a driven roller 66 at its forward end. The driven roller 66 is rotatably supported on a rod extending between the side walls 58 of the housing 54. A flexible endless belt 68 extends around the periphery of the rollers 64 and 66. The flexible endless belt 68, as shown more clearly in FIGURES 7 and 8, extends below the bottom surface of the bottom wall 60. A magnetic unit comprising a pair of rows 72 and 74 of permanent magnets is provided within the housing 54 extending longitudinally along the bottom wall 60. The rows 72 and 74 of magnets are preferably disposed with their south-poles adjacent one another as shown more clearly in FIGURE 7. The rows of magnets 72 and 74 are preferably separated from the bottom wall 60 by stainless steel wear plates 75.

The de-lidding conveyor 52 is supported for pivotable movement adjacent the center post 18. The de-lidding conveyor 52 has pivotable motion towards and away from the horizontal portion of the conveyor 30. The forward end of the de-lidding conveyor 52 is disposed adjacent the left hand end of the horizontal portion of the conveyor 30 as shown more clearly in FIGURE 1. The forward end of the de-lidding conveyor 52 is suspended above the horizontal portion of the conveyor 30 by a chain 76 secured to the strut 62. The chain 76 cooperates with the periphery of a sprocket 78 fixedly secured to a rod 80. The free end of the chain 76 is provided with a counterweight 82. The counterweight 82 maintains the forward end of the de-lidding conveyor 52 in suspended relation to the horizontal portion of the conveyor 30. The flexible endless belt 68 can be tensioned on the rollers 64 and 66 by the adjustment means 84 which relocates the roller 66 with relation to the roller 64.

Figure 1B:
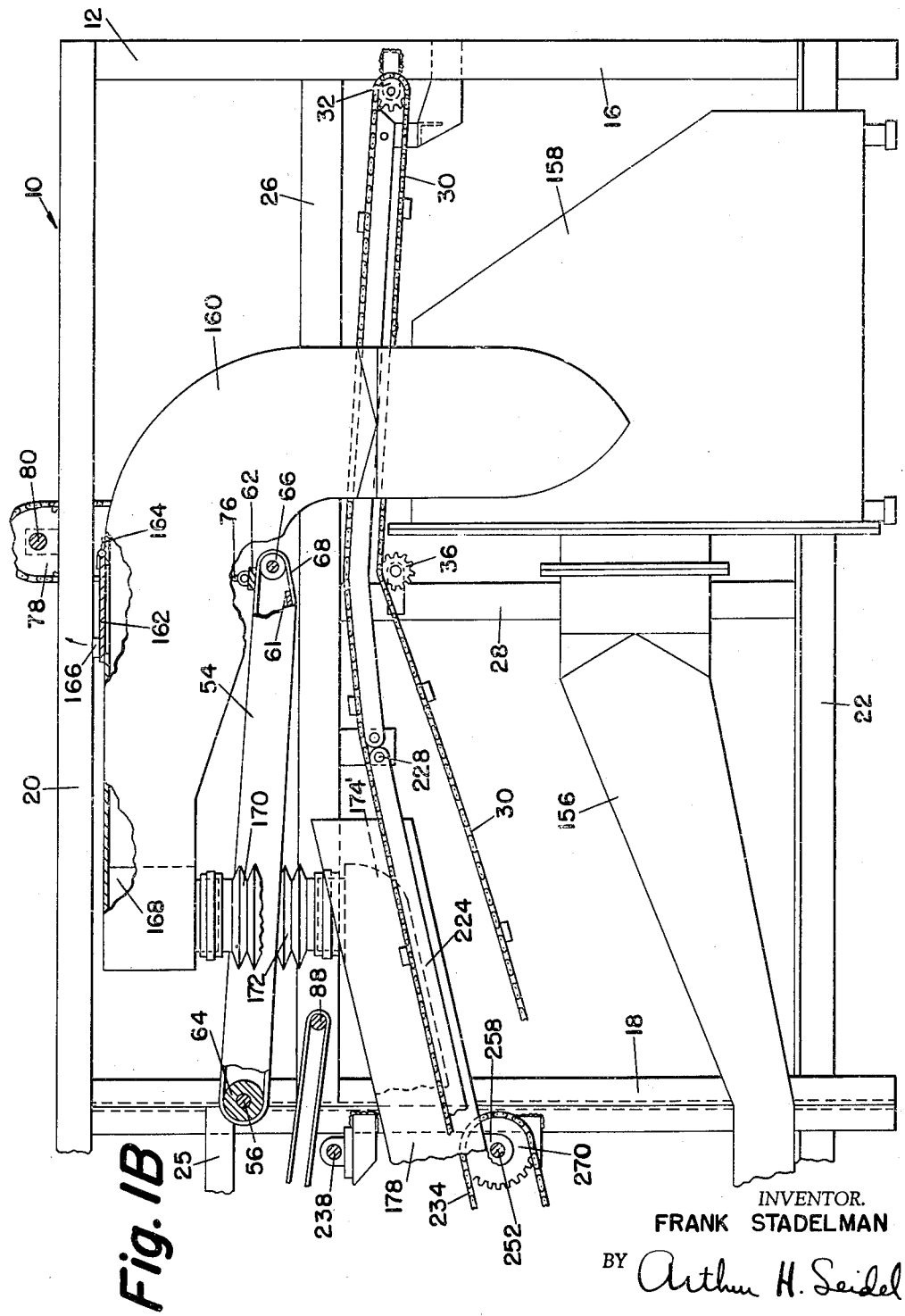
FIGURE 1B is a longitudinal sectional view of the right hand end of the machine in FIGURE 1 on an enlarged scale.

As shown more clearly in FIGURE 1, a lid conveyor is provided extending from end post 14 to a position slightly in front of center post 18. The lid conveyor comprises a flexible endless belt 86 supported on a driving sprocket 90 and a driven roller 88. The lid conveyor transports the lids 48 in a direction as shown by arrow 92.

As shown more clearly in FIGURE 6, rod 80 is provided with a clevis 95. The clevis 95 is pivotably connected to a clevis 98 by link 96. Link 96 is provided with a longitudinal slot 99 at one end thereof. A pin 100 extends through the clevis 95 and the slot 99 so as to pivotably secure the clevis 95 to the link 96. The clevis 98 is pivotably secured to the link 96 by a pin 102. The clevis 98 is fixedly secured to rod 104. The rod 104 extends across the width of the machine 10 and is supported in bearings 106, only one has been shown in FIGURE 6. As shown in FIGURE 6, the bearing 106 is fixedly secured to a plate 108. The plate 108 is fixedly secured to the center post 18. The rod 104 extends through the bearing 106 and plate 108 to an arm 110 which is fixed to the extremity of the rod 104. The arm 110 is provided with a spring biased latch 112. The spring biased latch 112 includes a pin which extends through the arm 110 to a gauge plate 114. The gauge plate 114 is provided with a plurality of holes 116. The holes 116 are positioned so that they form an arc of a circle. The pin on the latch 112 is selectively positioned into the holes 116. When the pin on the latch 112 is in the lowermost hole 116, the de-lidding conveyor 52 is in its uppermost position. As the pin on the latch 112 is positioned in adjacent holes 116 is shown by the arrow 118, the rod 80 rotates in the direction in the arrow 120 thereby lowering the forward end of the de-lidding conveyor 52. Thus, a means has been provided for adjusting the position of the forward end of the de-lidding conveyor 52 so as to accommodate different types of pan straps which are of different heights.

As seen more clearly in FIGURES 1 and 3, a bread conveyor 122 is provided. The bread conveyor 122 includes a housing having a pair of parallel spaced side walls 124 and 126. A top wall 128 is fixedly secured intermediate the side walls 124 and 126 and spaced downwardly from the upper surface of said side walls 124 and 126. A bottom wall 130 is provided intermediate the side walls 124 and 126. The side wall 126 is provided with an opening 132 intermediate its ends. An endless belt 134 having spaced bars therealong is provided around the housing adjacent the upper wall 128 and the lower wall 130. The endless belt 134 extends around driving sprocket 136 and driven sprocket 138. The driven sprocket 138 is provided with a tension means 139 for adjusting the position of the driven sprocket 138. The outer surface of the endless belt 134 is provided with spaced foam plastic pads 140.

As shown more clearly in FIGURE 4, the bottom wall 130 is provided with a pair of spaced substantially parallel slots 142. The slots 142 extend along the bottom wall 130 and are provided with ends 144 and 146. The end 144 of the slot 142 is substantially larger in cross-sectional area than the cross-sectional area of the slot 142 at end 146. The end 144 of the slot 142 is positioned at the forward end of the wall 130 near the driven sprocket 138. The end 146 is at the rear portion of the wall 130 near the driving sprocket 136. Intermediate the slots 142, there is provided an open outwardly facing trough 148. The link 150 on the belt 134 extends into the trough 148. The endless belt 134, the foam plastic pads and the links 150 are substantially the same as set forth in the above mentioned co-pending application.

A conduit 152 having a flange 154 is fixedly secured to the wall 126 around the opening 132. As shown more clearly in FIGURES 1 and 5, the conduit 152 extends downwardly to the bottom horizontal beam 22. The conduit 152 extends along the horizontal beam 22 and is provided with an upwardly directed extension 156. The extension 156 is connected to the inlet of the exhaust device 158. The exhaust device 158 includes a means, such as a suction pump, for creating a suction in conduit 152 and extension 156. An outlet conduit 160 is connected to the outlet of the exhaust device 158. As shown more clearly in FIGURE 5, the outlet conduit 160 is provided with a relief valve 162 pivotably secured to the top surface by hinge 164. A weight 166 is secured to the relief valve 162 so as to bias the relief valve 162 to its closed position. The outlet conduit 160 is provided with a conduit extension 168. A flexible conduit member depends from the extremities of the conduit extension 168. As shown in FIGURE 5, the flexible conduit members comprise bellows 170 and 172. A conduit 174 is sealingly secured to the outlet end of bellows 170. A conduit 174' is sealingly secured to the outlet end of bellows 172. The conduits 174 and 174' terminate in opposed nozzles 176 and 176'. As shown more clearly in FIGURE 3, the conduits 174 and 174' are fixedly secured to parallel, opposed plates 178.

The air sucked into the bread conveyor 122 is recirculated by means of conduits 152, 156, 160, 168, bellows 170, 172, and conduits 174, 174' and is discharged through nozzles 176 and 176' in a horizontal stream parallel to and beneath the bread conveyor 122. The suction device 158 must be of sufficient strength so as to maintain the loaves of bread on the bottom surface of the conveyor belt 134. When the suction is of sufficient strength so as to maintain loaves of bread on the bottom surface of the conveyor belt 134, the suction creates a partial vacuum between adjacent loaves of bread. Therefore, the adjacent loaves of bread tend to tilt toward one another. If adjacent loaves of bread are titlted toward one another, they will not come off the bread conveyor 122 properly. Therefore, nozzles 176 and 176' are provided on opposite sides of the conveyor 122 to direct the stream of pressurized air between adjacent loaves of bread so as to prevent the adjacent loaves of bread from tilting toward one another.

If all of the air withdrawn from the bread conveyor 122 were recirculated to the nozzles 176 and 176', the stream of pressurized air would blow the loaves of bread off the conveyor belt 134. Therefore, only a portion of the air is recirculated to the nozzles 176 and 176'. The cross-sectional area of the nozzles 176 and 176' are substantially smaller than the cross-sectional area of the outlet conduit 160 so that only approximately ten perment of the recirculated air is discharged through the nozzles 176 and 176'. The back pressure of air in the conduits 174, 168 and 160 opens the relief valve 162. The air which is not recirculated through the nozzles 176 and 176' is discharged through the relief valve 162.

A pair of nozzle housings 180 are fixedly secured to the top surface of parallel plates 178. The nozzle housings 180 are positioned on the plates 178 substantially adjacent to the driven sprocket 138 on the bread conveyor 122. Each nozzle housing 180 is provided with a depending nozzle 182 and a flexible supply hose 184 which is connected to a source of air under pressure. The purpose of nozzles 182 will be made clear hereinafter.

A conveyor 186 for transferring the loaves of bread 188 which were de-panned by the bread conveyor 122 is provided between the bread conveyor 122 and the conveyor 30. The bread loaf conveyor 186 is provided with a driving sprocket 190, a driven roller 192, and an endless belt 194. A tension means 196 is provided for tensioning the belt 194.

Referring to FIGURE 9, it will be seen that a means is provided for adjusting the position of the belt on the conveyor 30 with relation to the belt on the bread conveyor 122. A pair of angle iron supports 200 are provided in spaced parallel relation on the frame 12. The angle iron supports 200 support bearings 202. A rod 204 is rotatably supported in the bearings 202. Rod 204 is provided with a right hand thread 206 and a left hand thread 208. A pair of carrier blocks 210 and 212 are threaded to the threads 208 and 206 respectively. Carrier block 210 is provided with a link 214 pivotably secured thereto. The other end of the link 214 is pivotably secured to a flange 218. Flange 218 is fixedly secured to an intermediate portion of the rail 224. The link 216 is pivotably secured at one end to the carrier block 212 and to the flange 220 at another end. The flange 220 is fixedly secured to an intermediate portion of the rail 222. The flanges 218 and 220 are opposed to one another. The rails 222 and 224 support the links 226 of the conveyor belt 30. As shown more clearly in FIGURE 1, the rails 222 and 224 are pivotably secured at one end to the frame by pin 228. The other end of the rails 222 and 224 are supported by slotted blocks 230. The slotted blocks 230 are provided with horizontally disposed slots. A pin on the extremities of the rails 222 and 224 extend through the slot in the slotted blocks 230.

A sprocket 232 is fixedly secured to one end of the rod 204. A flexible chain is disposed around sprocket 232 and sprocket 236. Sprocket 236 is fixedly secured to a rod 238. Rod 238 is rotatably mounted in bearings 240 and 242 above rod 204. Bearing 240 is fixedly secured to one of the center posts 18 on one side of the machine 10. The other end of rod 238 is rotatably mounted in bearing 242 which is supported on angle iron support 244. A counter 246 is mounted on the other center support post 18. The counter 246 is provided with a shaft 248. Shaft 248 is rotatably connected to shaft 238 by a pair of sprockets and a flexible chain. The counter 246 indicates the number of revolutions of rod 238. One end of the rod 238 extends through a support fixed to the center support post 18 and is provided with a hand wheel 250 at its extremity. In order to make the counter 246 accurate to a very fine degree, the sprocket on the rod 238 should be small as compared to the sprocket on the extremity of rod 248.

As shown more clearly in FIGURE 10, a means has been provided for adjusting the width of the plates 178 so that the machine may accommodate pan straps of different widths. A rod 252 extends substantially the full width of the machine 10 and is rotatably supported in bearings adjacent its extremities. Rod 252 is provided with a right hand thread 254 and a left hand thread 256. Carrier block 258 is threaded to the thread 254 and carrier block 260 is threaded to the thread 256. The carrier blocks 258 and 260 are fixedly secured to spaced plates 178. A rod 262 extends across substantially the full width of the machine 10 and is positioned in spaced parallel relation to the rod 252. The rod 262 is threaded in the same manner as rod 252. Carrier blocks 264 and 268 are threaded to the rod 262. Carrier blocks 264 and 268 are fixedly secured to the spaced plates 178. A driving sprocket 270 is fixedly secured to the rod 252. A driven sprocket 272 is fixedly secured to the rod 262. A flexible chain 274 connects the sprockets 270 and 272. A sprocket 276 is fixedly secured to the rod 252 and a flexible endless chain 280 connects sprocket 276 with sprocket 278. Sprocket 278 is fixedly secured to rotatable shaft extending from the counter 282. Counter 282 is substantially the same as counter 246. A hand wheel 283 is fixedly secured to an extremity of the rod 252.

As seen more clearly in FIGURE 1, a motor 284 is fixedly secured to the machine 10. The output shaft from the motor 284 extends into a variable reducer 285. The output shaft of the variable reducer 285 is provided with a sprocket 286. The sprocket 286 rotates in a counter-clockwise direction as shown in FIGURE 1. The driving sprocket 286 is operatively secured by flexible chain 288 and idler sprockets 290 and 292 to the driving sprockets 90, 190, 34 and 136. A flexible endless chain 70 connects sprocket 286 with idler sprocket 295. Chain 70 drives sprocket 293. Sprocket 293 is fixedly secured to rod 56. Thus, it will be seen that the sprocket 286 drives the de-lidding conveyor 52, the bread de-panning conveyor 122, the lid conveyor, the bread conveyor 186, and the pan strap conveyor 30.

The operation of the automatic de-lidding and depanning machine of the present invention is as follows:

With the motor 284 and the exhaust device 158 running, a filled and lidded pan strap 40 is placed on the front end of the pan strap conveyor 30 between the end posts 16. The pan strap conveyor 30 carries the pan strap 40 to a position where the lid of the pad strap 40 contacts the toe portion 61 of the de-lidding conveyor 52. The lid 48 of the pan strap 40 forces the de-lidding conveyor 52 to pivot upward slightly so that the lid 48 will be below and juxtaposed to the bottom wall 60 of the de-lidding conveyor 52. Since the lid 48 is made from magnetic material, the magnets within the housing 54 will attract the lid 48 to the bottom wall 60 of the housing 54. The lid 48 will then be removed from the pan strap 40 by the magnetic attraction of the rows of magnets 72 and 74 and held against the moving endless belt 68. The endless belt 68 will convey the lid 48 toward the roller 64. The rows of magnets 72 and 74 end in front of the roller 64, therefore the lid 48 will be dropped. The endless flexible belt 86 is disposed beneath the roller 64 and will catch the lid 48. The lid 48 will be conveyed off of the endless belt 86 in the direction of the arrow 92.

At the same time that the lid 48 is being removed from the pan strap 40, the pan strap 40 moves down the angled portion of the conveyor 30. The de-lidded pan strap 40 moves down the conveyor 30 to the de-panning conveyor 122. During the downward movement of the pan strap 40, a connecting bar on the conveyor 30 prevents the pan strap 40 from sliding under its own weight. Thus, the pan strap 40 moves along the angled portion of the conveyor 30 at the speed of the conveyor belt.

When the pan strap 40 passes under the de-panning conveyor 122, the pads 140 of the de-panning conveyor 122 contact the top of the bread loaves in the pan elements 42. The exhaust device 158 creates a suction in the conduits 152 and 156. The suction from conduit 152 is transmitted into the interior of the de-panning conveyor 122. The inrush of air through the slots 142 and between the adjacent pads 140 causes a suction which draws the loaves of bread out of the pan elements 42 and holds the loaves of bread on the under surface of the belt 134. The air nozzles 182 are positioned so that when the pads 140 of the de-panning conveyor 122 contact the loaves of bread to draw the same to the belt 134, the nozzles 182 direct a stream of air between the ends of the bread loaves and the ends of the pan elements 42. The stream of air from the nozzles 182 passes between the ends of the bread loaves and the end of the pan elements 42 to break any sticking between the bread loaves and the pan elements 42, and thereby facilitates the lifting of the bread loaves from the pan elements 42.

As the pan strap conveyor 30 carries the pan strap 40 downwardly under conveyor 122, the bread loaf is held to the de-panning conveyor endless belt 134 and is carried along by said belt 134. Since the pan strap conveyor 30 moves downwardly away from the de-panning conveyor 122, the bread loaf will be slowly lifted out of the pan element 42 until the bread loaf is completely free from the pan element 42.

The de-panning conveyor 122 carries the bread loaf 188 to a point over conveyor 186. Since the width of the openings 142 in the bottom wall 130 decrease from the large end 144 to the small end 146, the suction holding the bread loaf 188 to the de-panning conveyor 122 decreases as the bread loaf 188 is carried along toward the bread conveyor 186. When the bread loaf 188 reaches a point over the bread conveyor 186, the suction holding the bread loaf to the de-panning conveyor 122 has decreased sufficiently to permit the bread loaf 188 to drop onto the bread conveyor 186. As adjacent bread loaves are carried by the de-panning conveyor 122, the suction tends to tilt adjacent breads toward one another thereby depositing said bread loaves onto the conveyor 186 on their sides.

A small portion of the air sucked into conduit 152 by exhaust devices 158 will be recirculated through nozzles 176 and 176'. Nozzles 176 and 176' direct a stream of pressurized air parallel to the flexible belt 134 on the bread de-panning conveyor 122. The pressurized stream of air satisfies the suction force which ordinarily tends to tilt adjacent bread loaves toward one another. Thus, the bread loaves 188 are deposited on the bread conveyor 186 in an upright position. The bread loaves 188 are carried off the machine 10 in the direction of arrow 298.

The empty pan strap 40 is conveyed by the conveyor 30 to the exit end of the machine 10 and is taken off in the direction of arrow 296.

In order to accommodate different size pan straps, the space between parallel plates 178 is caried. To vary the space between plates 178, hand wheel 283 is rotated. Rotation of hand wheel 283 causes rod 252 and rod 262 to rotate. Rotation of rods 252 and 262 causes the carrier blocks 258, 260, 264 and 268 to move toward or away from one another. As the carrier blocks move toward and away from one another, the plates 178, the nozzles 176 and 176' and the nozzles 182 are moved toward and away from the bread depanning conveyor 122. The number of revolutions which the hand wheel 283 must be turned can be conveniently determined by the counter 282. The counter 282 indicates the number of revolutions of the hand wheel 283. The specific number of revolutions of the hand wheel 283 will move the plates 178 a specific distance toward or away from one another.

If the pan straps or the bread loaves vary in height, the hand wheel 250 is rotated to move the conveyor 30 closer to the bread de-panning conveyor 122. Rotation of the hand wheel 250 rotates rod 204. Rotation of rod 204 causes the carrier blocks 210 and 212 to move toward or away from one another. As the carrier blocks 210 and 212 move toward or away from one another, the rails 222 and 224 are raised or lowered at an intermediate position. One end of the rails 222 and 224 pivots about pin 228 while the other end of the rails moves toward the pin 228 in the slot in blocks 230. The relationship between counter 246 and the hand wheel 250 is identical with relationship of counter 282 and hand wheel 283.

Hand wheels 250 and 283 are preferably disposed on the same side of the machine as arm 110. The arm 110 and the hand wheels 250 and 283 are preferably enclosed within a box which also includes the switches for operating the motor 180 and the exhaust device 158. Since the plates 178 are movable toward one another, the machine 10 is versatile in the range of pan straps that may be de-lidded and de-panned thereon. Since the conduits 174 and 174' are connected in the recirculation circuit by flexible bellows 170 and 172, the nozzles 176 and 176' can be moved with the plates 178. Since the belt on the conveyor 30 may be moved upwardly towards the de-panning conveyor 122, the machine 10 is versatile in the width and height of the pan straps that may be accommodated. Although the machine 10 of the present invention can automatically de-lid and de-pan a pan strap filled with loaves of bread, the machine can be used merely to de-lid or de-pan a pan strap. Thus, pan straps which are provided with loaves of bread which were baked without lids can be de-panned with the present invention.

The present invention may be embodied in other specific forms without departing from the spirit or essential attributes thereof and, accordingly, reference should be made to the appended claims, rather than to the foregoing specification as indicating the scope of the invention.

I claim:

1. In a machine for de-panning a pan strap containing a plurality of loaves of bread arranged in side-by-side relation comprising a frame, a pan strap conveyor supported on said frame, said pan strap conveyor having an angled portion extending downwardly from the horizontal, a bread de-panning conveyor on said frame above said pan strap conveyor, suction means for transferring said bread from said pan strap to said bread de-panning conveyor, air passages in said bread de-panning conveyor so that air may be sucked into said bread de-panning conveyor between adjacent loaves of bread, and nozzle means adjacent said bread de-panning conveyor for directing a controlled amount of pressurized air between adjacent loaves of bread adapted to be supported by said bread de-panning conveyor so as to prevent adjacent loaves of bread from being tilted toward one another by said air which is sucked into said de-panning conveyor.

2. In a machine as set forth in claim 1 wherein said nozzle means is part of a recirculation circuit, said pressurized air being a portion of said air sucked into said bread conveyor between said loaves and recirculated to said nozzle means, and a valve upstream of said nozzle means for discharging the remainder of said air.

3. In a machine as set forth in claim 2 including a flexible portion in said recirculation circuit between said valve and said nozzle means so that said nozzle means may be adjustably positioned with relation to said bread de-panning conveyor.

4. In a machine as set forth in claim 3 wherein said flexible portion and said valve are positioned in a section of said recirculating circuit located within said frame.

5. In a machine comprising a bread de-panning conveyor and a pan strap conveyor below said bread de-panning conveyor, said bread de-panning conveyor being an endless belt having a plurality of air spaces therein, porous pads on said endless belt for contacting bread loaves, a closed housing in said bread de-panning conveyor, slots in the bottom wall of said housing adjacent said belt, an opening in another wall of said housing, a suction means connected to said opening for creating a partial vacuum in said housing, said partial vacuum transferring bread loaves from a pan strap on said pan strap conveyor to said belt, and a nozzle means adjacent said bottom wall for directing a controlled amount of pressurized air parallel to said bottom wall between adjacent loaves of bread adapted to be supported by said belt adjacent said slots so as to prevent adjacent loaves from tilting toward one another.

6. In a machine as set forth in claim 5, wherein said nozzle means is part of a recirculation circuit, said pressurized air being a portion of the air sucked into said housing, and recirculated to said nozzle means, and a valve upstream of said nozzle means for discharging the remainder of said air.

7. In a machine as set forth in claim 5 including a pair of plates, one plate on each side of said pan strap conveyor, a pair of spaced rods, a pair of movable carrier blocks on each rod, said plates being supported by said carrier blocks in spaced parallel relation, movable elements connecting said rods for rotary movement in unison to move said pairs of carrier blocks in opposite directions along said rod, a handle on one rod for rotating said rod, and said nozzle means being supported on said plates for movement therewith.

8. In a machine as set forth in claim 6 including a flexible portion in said recirculation circuit between said valve and said nozzle means so that said nozzle means may be adjustably positioned with relation to said bread de-panning conveyor, and mechanical elements for moving said nozzle means with relation to said bread de-panning conveyor.

9. In a machine as set forth in claim 5 including a pair of spaced parallel rails beneath said pan strap conveyor, said rails being supported intermediate their ends by carrier blocks, said carrier blocks being movable towards and away from one another on a rod substantially perpendicular to said rails, a pivoted element between said rails and said carrier blocks so that as said carrier blocks move toward one another an intermediate portion of said rails moves said pan strap conveyor closer to said bread de-panning conveyor, and a handle member on said rod for moving said carriers toward and away from one another by rotation thereof.

10. A method of de-panning a pan strap containing a plurality of loaves of bread disposed in side-by-side relation, which method comprises the steps of placing a pan strap onto a moving first conveyor belt, moving said pan strap along said first conveyor belt, engaging the top surface of the bread loaves with a porous pad on a second conveyor belt, transferring the bread loaves to said second conveyor belt by means of a suction, and directing a controlled amount of pressurized air between adjacent loaves of bread supported on said second conveyor belt so as to prevent adjacent loaves of bread from tilting toward one another.

11. In a method in accordance with claim 10 wherein said step of directing pressurized air between adjacent loaves of bread includes the step of recirculating some of the air which was used in the transferring of the bread loaves to the second conveyor.

12. In a method in accordance with claim 10 including the step of decreasing the suction effect on the loaves of bread by decreasing the effective area of application of the suction on the loaves as they move along the second conveyor.

References Cited in the file of this patent

UNITED STATES PATENTS

| | | |
|---|---|---|
| 191,001 | Chase | May 22, 1877 |
| 1,413,743 | Lawrence et al. | Apr. 25, 1922 |
| 1,945,886 | Den Boer | Feb. 6, 1934 |
| 2,445,884 | MacManus | July 27, 1948 |
| 2,470,889 | Drescher | May 24, 1949 |
| 2,485,040 | Cupo | Oct. 18, 1949 |
| 2,668,002 | Temple | Feb. 2, 1954 |
| 2,675,953 | Van Poolen | Apr. 20, 1954 |
| 2,683,560 | Keller | July 13, 1954 |
| 2,778,180 | Eyster | Jan. 22, 1957 |
| 2,886,195 | Stadelman | May 12, 1959 |
| 2,927,707 | Reed et al. | Mar. 8, 1960 |

FOREIGN PATENTS

| | | |
|---|---|---|
| 908,962 | Germany | Apr. 12, 1954 |